United States Patent [19]

Taniu et al.

[11] Patent Number: 5,289,490
[45] Date of Patent: Feb. 22, 1994

[54] LASER GENERATION APPARATUS

[75] Inventors: Yoshito Taniu, Saitama; Mikinori Shono, Yokohama; Koichiro Wazumi, Yokohama; Akihiro Nishimi, Yokohama, all of Japan

[73] Assignee: Ishikawajima-Harima Heavy Industries Co., Ltd., Tokyo, Japan

[21] Appl. No.: 939,724

[22] Filed: Sep. 2, 1992

[30] Foreign Application Priority Data

Sep. 3, 1991 [JP] Japan ................................. 3-223159
Apr. 23, 1992 [JP] Japan ................................. 4-104961

[51] Int. Cl.$^5$ ............................................. H01S 3/08
[52] U.S. Cl. ........................................ 372/92; 372/68; 372/72; 372/66; 372/69
[58] Field of Search ............... 372/92, 72, 68, 69, 372/66, 20

[56] References Cited

U.S. PATENT DOCUMENTS

| | | | |
|---|---|---|---|
| 3,283,262 | 11/1966 | Marcatili . | |
| 3,555,449 | 1/1971 | Osial et al. | 372/72 |
| 3,582,816 | 6/1971 | Waszak | 372/72 |
| 3,891,945 | 6/1975 | Schlossberg et al. | 372/66 |
| 3,992,684 | 11/1976 | Patrick et al. | 372/20 |
| 4,751,716 | 6/1988 | Ream et al. | 372/66 |
| 4,910,746 | 3/1990 | Nicholson | 372/68 |

FOREIGN PATENT DOCUMENTS 1614663 7/1970 Fed. Rep. of Germany .

OTHER PUBLICATIONS

Kaminskii, JETP Letters, "Laser With Combined Active Medium", vol. 7, No. 8 dated Apr. 20, 1968, pp. 201-203.

Steele et al., Optics Letters, "Broadly tunable high-power operation of an all-solid state titanium-doped sapphire laser system" vol. 16, No. 6, dated Mar. 15, 1991, pp. 399-401.

*Primary Examiner*—Léon Scott, Jr.
*Attorney, Agent, or Firm*—Finnegan, Henderson, Farabow, Garrett & Dunner

[57] ABSTRACT

The present invention relates to a solid state laser generation apparatus which is composed of modularized solid state lasing units which enable construction of a compact cascading laser apparatus having a low lasing threshold value and a high laser generation efficiency. A lasing rod and the electrodes for the excitation of the rod are housed in a common module casing which has depressed sections on its external surface. When assembling two modular units, one of the module units is rotated axially with respect to the other in such a way to insert the electrodes into the depressed section on the external surface of the neighboring module so as to minimize the mechanical interference caused by the neighboring components. By utilizing such a modular arrangement, the lasing rod spacing between the neighboring module units can be shortened, thus resulting in lower coupling losses between the adjacent rods even during the initial phase of the operation. The resulting multi-rod laser apparatus, whose input/output power relationship is linear, is efficient and compact, thus allowing an improved control over the laser output power and facilitating the overall operation.

5 Claims, 5 Drawing Sheets

LASER GENERATION APPARATUS

BACKGROUND OF THE INVENTION

1. Field of the Invention

The present invention relates to a solid state laser generation apparatus, and relates in particular to a technology for improving the generation efficiency by decreasing the distance of separation, or spacing, between the components such as lasing rods and other peripheral devices.

2. Background Art

In rod type solid state lasers such as Nd·YAG lasers, the output power is increased by providing a number of laser generation rods 3 (hereinafter referred to as the rods 3) arranged in a cascading manner as shown in FIG. 9, on a common optical axis B between a rear reflecting mirror 1 opposing an output reflecting mirror 2 disposed at a distance.

Also, a suitable number of excitation lamps 4, such as arc lamps acting as a laser beam generation source, are disposed on the side of the rod 3, as shown in FIG. 10. Around the excitation lamps 4, there is disposed a reflecting cylinder 5, which reflects and focuses the excitation beams onto the rod 3. In FIG. 10, 6 is a rod holder, 7 is an electrode and 8 is a lamp holder.

By irradiating each of the several rods 3 with the excitation radiation, and by having the generated laser beams reflect back and forth between the mirrors, a pumped excited state is generated.

In such a laser generation apparatus, the rods 3 are heated by the excitation energy, and as the temperature rises, such effects as differential thermal expansion and changes in the index of refraction caused by internal stresses cause a phenomenon known as the thermal lens effect (referred to as thermal effect hereinbelow) which produce optical effects similar to a convex lens which produces converging beams.

Because of such converging effects of the reflecting beams, the parallel alignment between the beam paths in the rods 3 and the optical axis B is degraded, resulting in a tendency for the lasing volume to decrease, which is the internal volume contributing to the generation of laser beams within the rods 3, and consequently the lasing efficiency of the overall apparatus is lowered.

Conventional remedial method is to compensate for the thermal degradation effects by fabricating the end surfaces 3a of the rods 3 in a concave shape so as to produce a refraction radius of $-2$ m to $-1$ m in the case of a laser rod of 152 mm length and 8 mm diameter, for example.

However, in the case of the conventional laser apparatus shown in FIG. 10, during the initial generation phase of the laser, the temperature of the rods 3 has not yet risen to the region which produces the thermal effect. The concave end surface effects (termed concave end effect) are operative, however, and the generated laser beams are apt to be diverged away during the early phases, thus requiring a larger initial energy input to bring the apparatus to the lasing stage. The lasing threshold value is thus raised, and this is a reason for impairing the lasing initiation ability.

To improve the lasing initiation ability and increase the lasing efficiency, it is effective to arrange the rods 3 so that the distance LR, in FIG. 9, between the rods 3 is less than the distance L1 and L2 between the rods and the mirrors. However, to provide such an arrangement, it is necessary to decrease the lengths of the portion of the rod holder 6 and the lamp holder 8, which extend beyond the ends of the rod laser. There is some possibility for decreasing the extended length of the rod holder 6, but the lamp holder 8 is more difficult to shorten because its length is governed by the length of the electrode.

The objectives of the present invention are therefore to:

1. increase the lasing initiation ability by reducing the threshold value of the excitation energy needed for the initiation of lasing action;
2. to raise the overall lasing efficiency;
3. to enable high laser power output easily and
4. to make the entire apparatus to become compact.

SUMMARY OF THE PRESENT INVENTION

Firstly, the present invention is related to a solid state laser generation apparatus consisting essentially of a plurality of modular lasing units placed on a common optical axis, between a rear reflecting mirror and an output reflecting mirror which are spaced apart and oppositely positioned. The modular unit comprises:

(a) laser beam generating means for generating laser beams aligned on said optical axis;

(b) a plurality of excitation means for providing excitation energy to said laser generation means, said excitation means being disposed parallel to said laser generation means, aligned on a common optical path and having electrode terminal means;

(c) end holding means for retaining the ends of said laser beam generating means; and (d) terminal holding means for retaining the ends including electrode terminal means, of said plurality of excitation means;

in which in each of the modular lasing unit, the rod holding means are disposed further inside than the lamp holding means.

In addition to the above basic configuration, the invented apparatus includes the following features.

Second, the rods and the excitation lamps are housed in the same casing.

Third, by having a reflective coating on the internal surface of the casing, a need for providing a separate reflector is eliminated.

Fourth, depressed sections are formed on the external surface of the casing, and the dimension from the center of the rod to the internal bottom surface of the depressed section is made smaller than the dimension from the center of the rod to the inside surface of the lamp holder.

Fifth, the lasing rods of each modular lasing unit are arranged in series on the common optical axis between the rear reflecting mirror and the output reflecting mirror so as to produce a cascading generation of laser beam.

Sixth, the electrodes in the lamp holding means for the excitation means which irradiate the lasing rods are disposed on the exterior surface of a casing at a selected angle about the optical axis along which are aligned the lasing means of the neighboring module units.

Seventh, the lamp holders for excitation lamps, which provide excitation radiation energy to the lasing rods are housed in the depressed section of the casing, and therefore, the overall apparatus is made compact.

Eighth, in a cascading multi-rod lasing apparatus, a number of modular lasing units are disposed in series on the optical axis so as to generate cascading laser beams, and the electrodes of the neighboring module units are disposed on the external surface of the casing so that they protrude out away from the rods at a selected radial angle around the optical axis to eliminate mechanical interference effects caused by such component parts.

PREFERRED EMBODIMENTS OF THE INVENTION

A first embodiment of laser generation apparatus according to the present invention will be explained below with reference to FIGS. 1 to 3.

Figure 9:
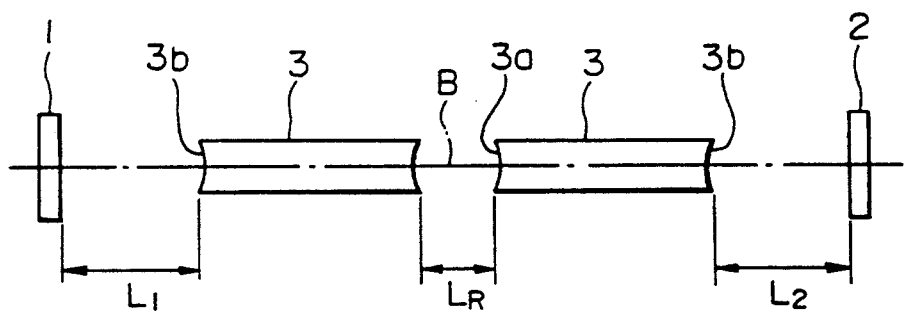
FIG. 9 is a front view of an example of the arrangement of the conventional laser generation apparatus.
Figure 10:
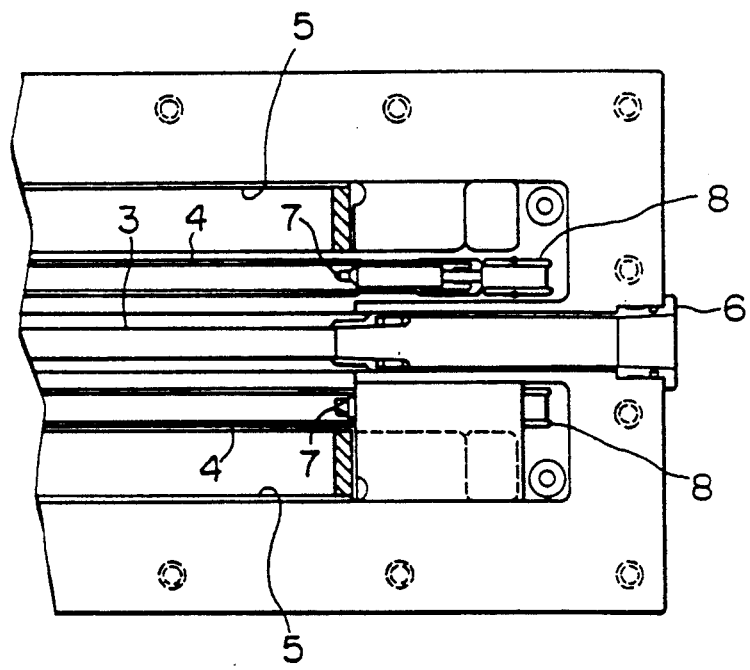
FIG. 10 is a front cross sectional view of the rod holder and the lamp holder of the conventional laser generation apparatus.

In the first embodiment, a plurality of rods 3 are disposed between a rear (reflecting) mirror 1 and an output (reflecting) mirror 2 on an optical axis B as in the conventional system which was illustrated in FIG. 9. To this basic system, however, the following new improvements are provided.

Figure 1:
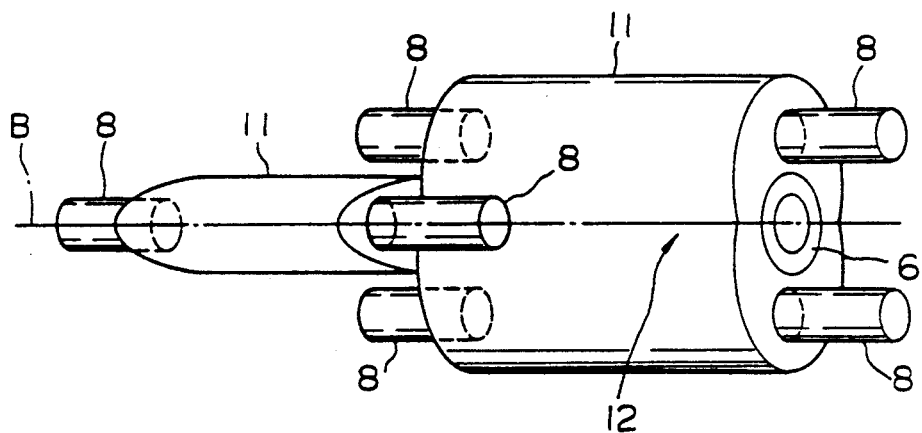
FIG. 1 is a perspective view of a first preferred embodiment of the invented laser generation apparatus.
Figure 2:
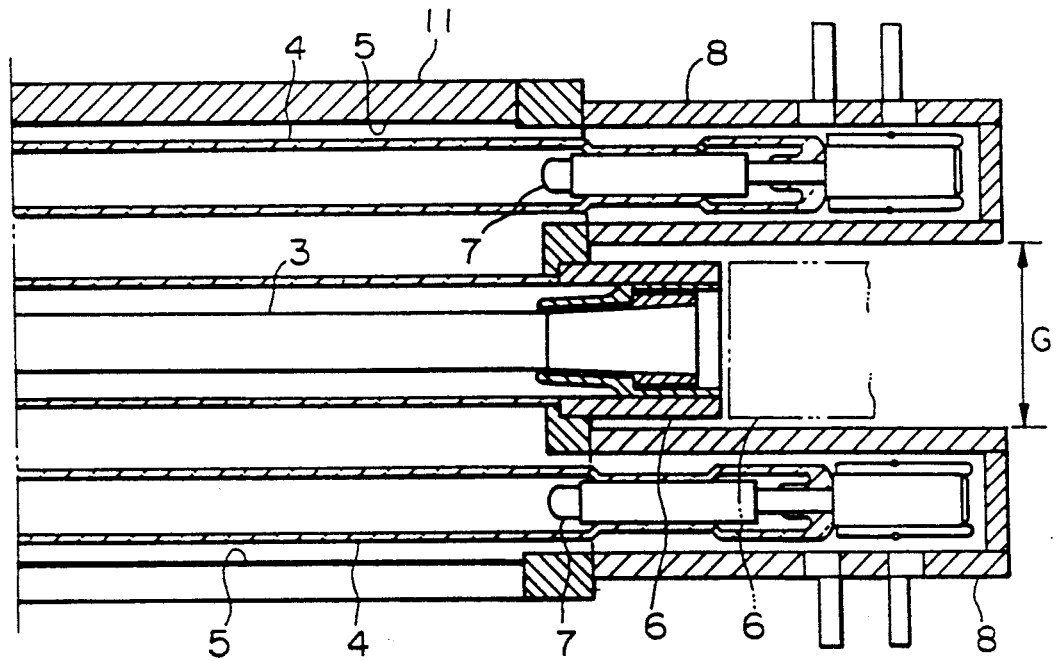
FIG. 2 is a front cross sectional view of the rod holder and the lamp holder shown in FIG. 1.

As shown in FIGS. 1 and 2, a module comprises a rod 3 and two excitation lamps 4 which are housed in a casing 11 which acts as a lasing cavity. An important feature is that the rod holder 6 is designed to be shorter than the lamp holder 8 as illustrated in FIG. 2, which shows that the rod holder 6 does not extend out in the axial direction as much as the lamp holders 8 do.

The casing 11 is made of a metallic material such as stainless steel or a ceramic material, and forms an encasing cylindrical space which houses a rod 3 and a pair of lamps 4 which surround the rod 3. The entire internal surface of the casing 11 is covered with a gold coating or other highly reflective thin film to increase its reflectivity, thereby providing a cylinder-shaped reflecting surface 5.

Figure 3:
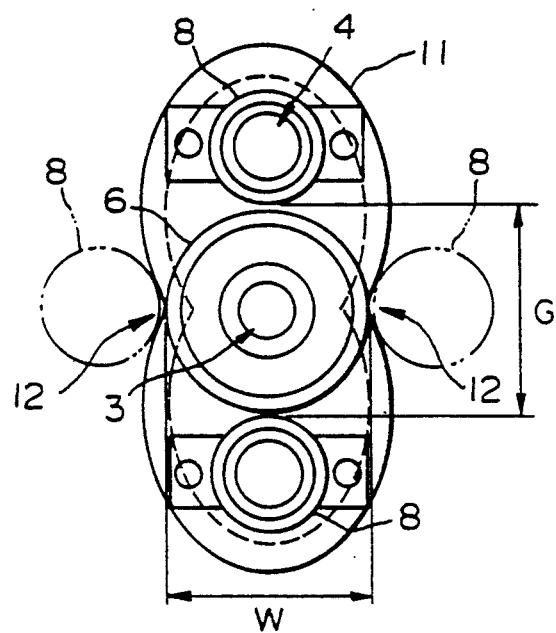
FIG. 3 is an end view of the first embodiment of the present invention.

As shown in FIG. 3, the external surface of the casing 11 is formed to produce a pair of depression sections 12 having a dimension W (representing the distance between the two bottom sections of the depressed section 12) which is made smaller than the distance of separation G between the pair of lamp holders 8.

The rod holder 6 is made short so that, as shown in FIG. 2, the amount of end protrusion of the rod holder 6 is less than that of the lamp holders 8.

When assembling the laser generation apparatus using the modular units as shown in FIG. 1, a second casing 11 (right) is rotated by 90 degrees with respect to a first casing 11 (left), and the two modules are fitted together by inserting the electrodes 7 and the lamp holders 8 (which includes the electrodes 7) of the first casing 11 into the spaces formed by the depression sections 12 on both external surfaces of the second casing 11. And, when the rod holder 6 of the first casing 11 is placed close to the rod holder 6 of the second casing as illustrated, respectively, by the solid and the dashed lines in FIG. 2, the rods 3 of the two casings become aligned along the same optical axis B and the two modular units are arranged in a serial manner.

According to such an assembly, the obstructing effects caused by the presence of the end sections of the electrodes 7 and the lamp holders 8, are eliminated, thereby permitting the rods 3 to be disposed closer to each other in correspondence to the shortened length of the rod holder 6.

When the distance between the rods (i.e. rod spacing) in the neighboring modules is shortened, there are a number of accruing advantages. During the lasing initiation phase during which the rod temperatures are relatively low, and the beams from one rod tend to diverge away from the adjacent rods, such divergent beams will not be effective in reinforcing the lasing action. By shortening the rod spacing, more of the beams from the adjacent rods 3 are made to enter the adjacent rods, thereby reducing the threshold value of the excitation radiation energy. The lasing efficiency is increased also as a result of suppressing the laser beam divergence.

In the normal operating conditions, the thermal effect overtakes the concave end effect, and the laser beams from the adjacent rods 3 become convergent and more confined, creating a tendency for the laser volume to decrease. When the rod spacing is decreased, the undesirable effect of decreasing lasing volume is moderated in correspondence to the shortened length, thereby improving the lasing efficiency and increasing the output power.

Further, by incorporating both effects into the lasing apparatus, i.e. the concave end effect to control beam divergence during the early phase of lasing action and the thermal effect to control the loss of lasing volume during the normal operation, the linearity of the input/output radiation energy is improved throughout the operation. Expressed in other ways, the response characteristics between the input excitation energy and the output laser power becomes more linearly related, so that the laser output power can be adjusted more readily, thereby facilitating the ease of operating the laser generation apparatus.

Figure 4:
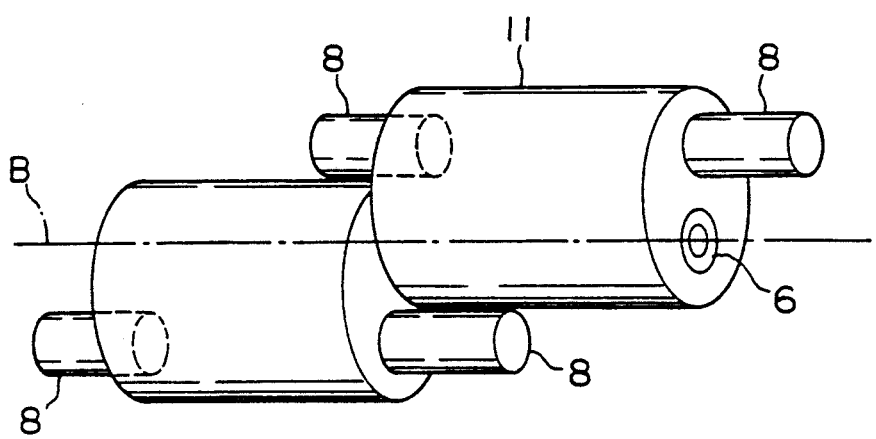
FIG. 4 is a perspective view of a second embodiment of the laser generation apparatus.

A second embodiment will be explained with reference to FIG. 4.

Similar to the previous embodiment, inside the casing 11 are disposed a rod 3 and an excitation lamp 4; the lamp holders 8 are disposed on the external surface of the casing 11; and the rod holder 6 is made to be shorter than the lamp holder 8. In line with FIG. 3, the distance, W/2, from the center of the rod 3 to the bottom of the depression section 12, is made smaller than the distance, G/2, from the center of the rod 3 to the inside edge of the lamp holder 8.

Therefore, when assembling two such modular units to produce a cascading laser generation apparatus, a first casing 11 is rotated 180 degrees from a second casing 11, and fitted together, thus placing the adjacent lasing rods close together as described in the first embodiment (shown in FIGS. 1-3) to produce a laser generation apparatus which has a lower lasing threshold value, improved lasing efficiency and improved linearity.

A third embodiment will be explained with reference to FIGS. 5 to 8. In this embodiment, the end portion of the casing 11 is composed of a number of components which are assembled together by embedded bolts or by adhesive bonding.

Figure 5:
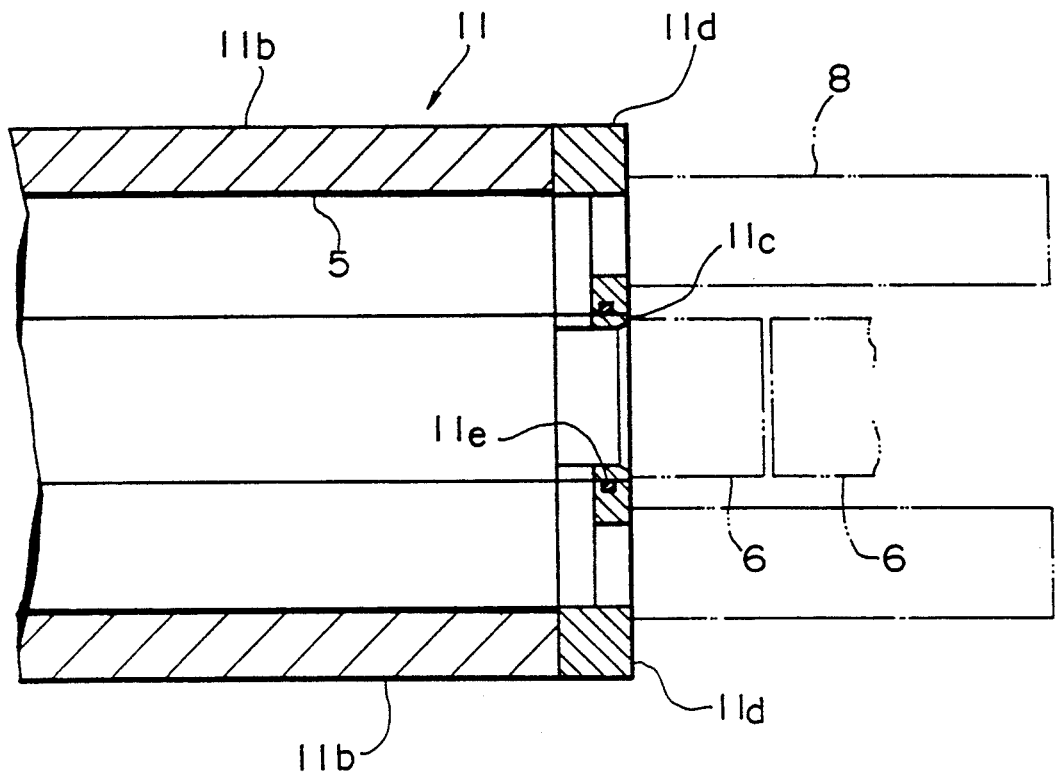
FIG. 5 is a front cross sectional view of a third embodiment of the laser generation apparatus.
Figure 6:
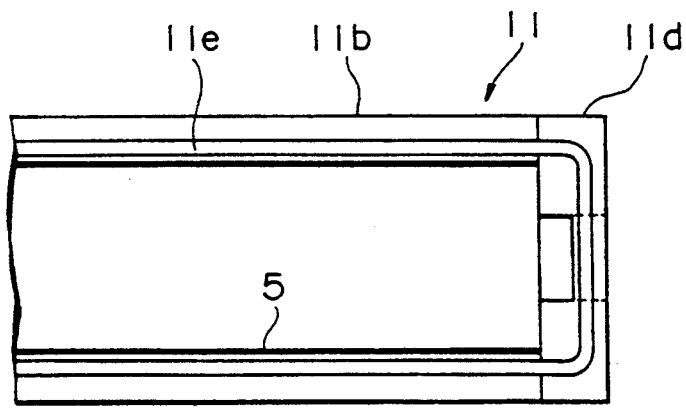
FIG. 6 is a plan view of the lamp sections of the end plate and of the casing shown in FIG. 5.
Figure 7:
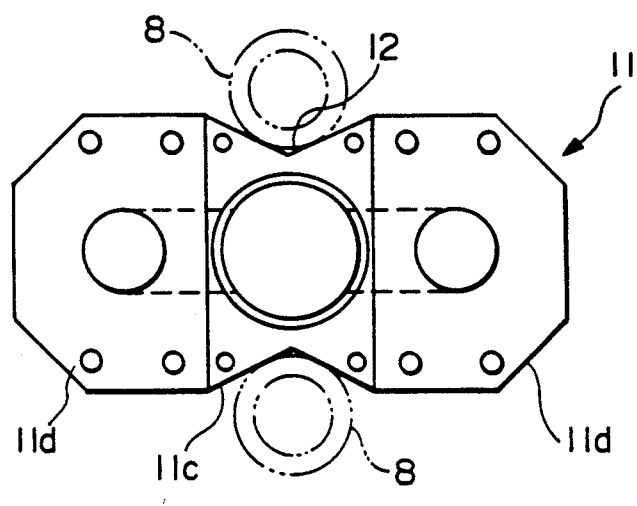
FIG. 7 is an end view of the rod section and the lamp section of the end plate of the casing shown in FIG. 5.
Figure 8:
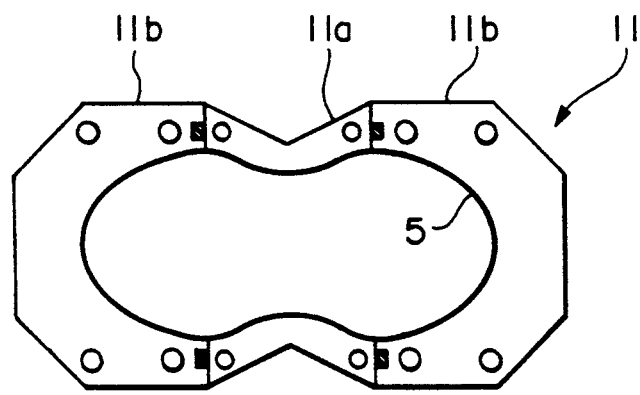
FIG. 8 is an end view of the rod section and the lamp section of the casing shown in FIG. 5.

The components comprising the casing 11 are: a rod portion casing 11a which surrounds the rod 3; a pair of lamp portion casing 11b which is disposed on both sides of the casing 11a and surrounds excitation lamps 4; a rod part end plate 11c which is disposed at the end of the opening portion of the rod portion casing 11a which holds the extended end portion of the rod holder 6; a lamp portion end plate 11d which holds the extended end portions of the lamp holders 8 and is disposed on the end of the opening of the lamp portion casing 11b and on both sides of the rod portion end plate 11c; and as shown in FIGS. 5 and 6, a seal portion 11e is disposed at the interface between a set of end portion 11a/11c (the rod portion casing 11a and the rod portion end plate 11c) and another set of end portion 11b/11d (the lamp portion casing 11b and the lamp portion end plate 11d) to provide hermetic sealing between the two sets of end portions. As in the previous embodiments, the internal surface of the casing constitutes a reflective surface 5.

This embodiment presents the same laser performance advantages presented in the previous embodiments achieved by decreasing the rod spacing, and in addition, this embodiment illustrates that the disclosed construction of the lasing apparatus facilitates assembly and disassembly activities.

The above discussed embodiments presented typical examples of arranging modular lasing units, including a rear mirror, an output mirror and proximally placed lasing rods arranged therebetween on one common optical axis and the excitation lamps which provide excitation radiation energy to the lasing rods disposed in parallel with the lasing rods. The modular lasing units so assembled in series to produce a cascading laser beam generating apparatus demonstrates the following advantages over the conventional laser generation apparatus.

First, invented arrangement delivers the following performance advantages.
(1) By decreasing the amount of axial protrusion of the rod holder, the distance between the rear mirror and the output mirror is decreased, thereby providing the ability to improve lasing initiation.
(2) When a number of lasing rods are to be arranged in a cascading manner, the rod spacing is decreased by suitably rotating and fitting the successive module units as described in the embodiments, and the lasing threshold value is lowered even during the initial phase of lasing, when the concave end effect of the lasing rod is greater than the thermal effect, by decreasing the divergence of the laser beams from the adjacent rods.
(3) The above noted effects contribute also to minimizing the lasing volume loss caused by the thermal effect, thus achieving a high lasing efficiency and increasing the laser output power.
(4) By controlling the beam divergence effect caused by the concave end effect, and by controlling the lasing volume loss caused by the thermal effect, the linearity of the input/output laser beams is improved throughout the operation, thus facilitating the ease of adjusting the output laser power.

Second, the overall lasing apparatus is made more compact (in comparison to the conventional apparatus of a similar power) because the excitation lamp and the lasing rod are housed within the same casing.

Third, by forming the excitation beam reflecting surface integrally with the internal surface of the casing, the excitation lamps can be placed in the same casing, thereby facilitating positioning of the energy source in relation to the reflective surface to maintain efficient operation of the compactly made lasing apparatus.

Fourth, by having depressed sections on the outside of the casing, and by making the distance from the center of the lasing rod to the bottom of the depressed section to be less than the distance from the center of the lasing rod to the inside edge of the lamp holder, the external dimensions of the modular lasing unit are decreased thus contributing to making the unit compact, and facilitating the assembling of the neighboring similarly shaped modular units.

Fifth, by cascading a number of lasing rods in series between the rear mirror and the output mirror, the lasing apparatus provides the following additional advantages.
(1) The laser rod spacing between the neighboring laser units is shortened; the divergence of the laser beams due to concavity effects and the lasing volume loss due to thermal effects are minimized; resulting in a stable laser output power throughout the operation of the laser generating apparatus.
(2) The coupling loss between the lasing rods is decreased, and the output power from an assembly of cascading lasing rods is increased.

Sixth, the electrodes for the excitation lamps which irradiate the lasing rods are orientated on each unit at a selected angle to accommodate the neighboring unit, which produce the following additional advantages.
(1) Because the electrodes of the neighboring excitation lamps are displaced in the radial direction around the optical axis, the mechanical interference caused by the radially protruding components is eliminated and the overall lasing apparatus is shortened.
(2) By placing a number of excitation lamps in the peripheral direction centered around the optical axis, the radiation intensity around the lasing rods is made uniform.

Seventh, by housing the lamp holders in the depressed section of the casing, the lamp holders are placed on the same light path, and the overall lasing apparatus is made compact.

Further, by aligning a number of lasing rods of a plurality of modular lasing units on one common optical axis to produce a cascading multi-rod lasing apparatus, the respective electrodes for the excitation lamps are made to protrude out radially at selected radial angles around the optical axis, thus leading to the following additional advantages.
(1) There is no mechanical interference in the axial direction caused by such components as excitation electrodes, thereby permitting to shorten the rod spacing, and decreasing the divergence of the laser beam from the adjacent rods, thus enabling to lower the lasing threshold value even during the initial lasing phase, during which the concave end effect of the lasing rod is greater than the thermal effect.

(2) By shortening the rod spacing, the lasing volume loss caused by the thermal effect is controlled, thus achieving a high lasing efficiency and increased laser output power.

(3) By controlling the beam divergence effect caused by the concave end effect of the end surface of the rod and by controlling the lasing volume loss caused by the thermal effect, the linearity of the input/output characteristics of the laser beams is improved, thus facilitating the ease of adjustment of the output power of the laser beam throughout the operation of the laser generation apparatus.

(4) By minimizing the mechanical interference effects in the axial direction, caused by the various components, such as the excitation electrodes, it is possible to shorten the overall length of the lasing apparatus.

Other Embodiments

In addition to the embodiments presented above, the following technological aspects are applicable to the following variations of embodiments.

(1) The number of excitation lamps 4, within one modular lasing unit, can be varied suitably.

(2) In positioning the neighboring excitation lamps 4, the electrodes 7 and the lamp holders 8 can also be staggered, within one modular lasing unit, at some suitable radial angles around the periphery to avoid mechanical interference.

(3) The lasing rod 3 can be other solid state lasers such as Nd·LYF (lithium yttrium fluoride)

(4) The number of lasing rods 3, within one modular lasing unit, can be varied suitably.

What is claimed is:

1. A solid state laser generation apparatus consisting essentially of a plurality of modular lasing units aligned in series on a common optical axis formed by a line between a rear reflecting mirror and an output reflecting mirror which are oppositely spaced and disposed apart, said each one of the plurality of modular lasing units comprising:

(a) laser beam generating rod means for directing laser beams aligned on said optical axis, wherein said laser beam generating rod means being disposed parallel to the optical axis and having opposite ends;

(b) a plurality of excitation means for providing excitation energy to said laser beam generating rod means, said excitation means being disposed parallel to said laser beam generating rod means and having electrode terminal means;

(c) said laser beam generating rod means and said excitation means are contained in a common causing means having internal and external walls and flat opposing ends, wherein said internal surface of said casing is covered with a reflective coating;

(d) a plurality of end holding means for retaining each end of said laser beam generating rod means and being disposed on the ends of the common casing means;

(e) a plurality of terminal holding means for retaining each end, including electrode terminal means, of said plurality of excitation means, wherein each terminal holding mean shaving an external surface and being disposed on the ends of the common casing means, wherein the terminal holding means protrudes farther from the end of the common casing means than the end holding means; and (f) wherein a plurality of depressed sections are formed on the external surface of said common casing, wherein the distance from said common optical axis to the bottom of one of a plurality of said depressed sections is less than the distance from the common optical axis to said external surface of said one of a plurality of terminal holding means so that the plurality of terminal holding means of a first modular laser unit can be disposed in said depressed sections of the common casing of an adjacent second modular lasing unit when the first and second modular lasing units are aligned in series on said common optical axis.

2. A solid state laser generation apparatus as claimed in claim 1, wherein said plurality of terminal holding means are disposed on the ends of said common casing means at a selected radial angle about said optical axis and, correspondingly, said plurality of depressed sections are formed on the external surface of said common casing at the selected radial angle.

3. A solid state laser generation apparatus as claimed in claim 2, wherein said selected angle is one selected from the group consisting of 90 and 180 degrees.

4. A solid state laser generation apparatus as claimed in claim 1, wherein said solid state laser generation apparatus is a Nd·YAG laser.

5. A solid state laser generation apparatus as claimed in claim 1, wherein said excitation means is one selected from the group consisting of arc lamp, mercury lamp and the like excitation means for generating excitation radiation.

* * * * *

UNITED STATES PATENT AND TRADEMARK OFFICE
CERTIFICATE OF CORRECTION

PATENT NO. : 5,289,490  
DATED : February 22, 1994  
INVENTOR(S) : Yoshito TANIU et al It is certified that error appears in the above-indentified patent and that said Letters Patent is hereby corrected as shown below:

Claim 1, column 8, line 2, change "causing" to --casing--.

Claim 1, column 8, line 3, change "causing" to --casing--.

Claim 1, column 8, line 14, change "mean shaving" to --means having--.

Signed and Sealed this

Twentieth Day of September, 1994

Attest:

BRUCE LEHMAN

*Attesting Officer*    *Commissioner of Patents and Trademarks*